E. R. FISCHER.
AUTOMOBILE BED.
APPLICATION FILED SEPT. 20, 1917.

1,259,220.

Patented Mar. 12, 1918.

Elvira R. Fischer, Inventor

Witnesses
K. N. Boorman
V. E. Langley

By Samuel Herrick
Attorney

UNITED STATES PATENT OFFICE.

ELVIRA R. FISCHER, OF SEATTLE, WASHINGTON.

AUTOMOBILE-BED.

1,259,220.

Specification of Letters Patent.

Patented Mar. 12, 1918.

Application filed September 20, 1917. Serial No. 192,246.

*To all whom it may concern:*

Be it known that ELVIRA R. FISCHER, citizen of the United States, residing at Seattle, in the county of King and State of Washington, has invented certain new and useful Improvements in Automobile-Beds, of which the following is a specification.

This invention relates to a foldable support for beds and it has for its object the provision of a simple and inexpensive structure constructed in such a manner that it may be folded into such small compass that it may be easily carried in the tool compartment of an automobile and will, when unfolded to operative position, be adapted to hook over the backs of the front and rear seats of an automobile and at such time lie in position to serve as supports for the front and rear seat cushions which complementally constitute a bed.

Further objects and advantages of the invention will be set forth in the detail description which now follows:

In the accompanying drawing.

Like numerals designate corresponding parts in all of the figures of the drawing.

Figure 1:
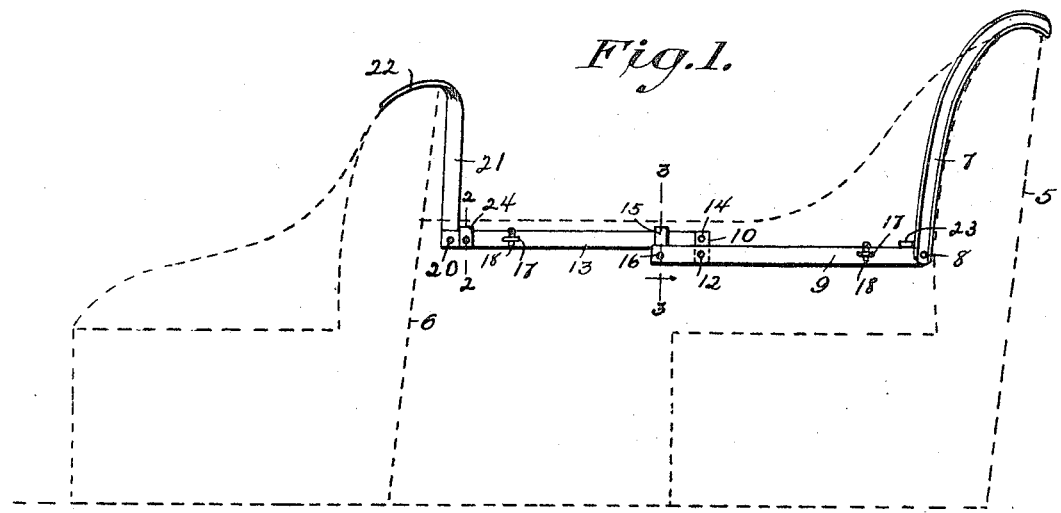
Figure 1 is a longitudinal, vertical section illustrating the seats of an automobile in dotted lines and illustrating the improved bed support in full lines.
Figure 2:
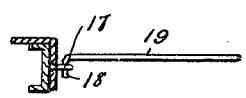
Fig. 2 is a vertical section upon line 2—2 of Fig. 1.
Figure 3:
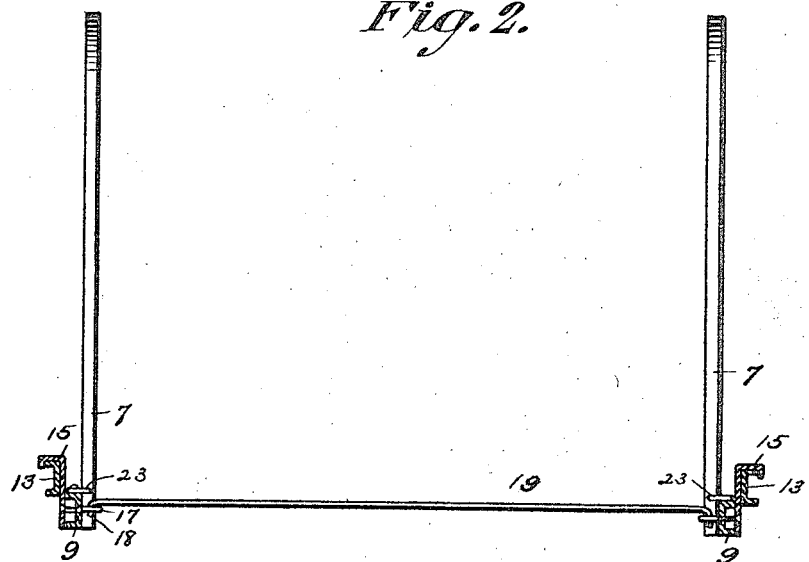
Fig. 3 is a vertical section upon line 3—3 of Fig. 1.

Referring to the drawing, 5 designates the rear seat and 6 the front seat of an automobile. The device constituting the present invention consists of two identical supports, each consisting of a rear hooked member 7 the upper end of which is adapted to hook over the top of the rear seat 5. These members are preferably, though not necessarily, made of channel iron. The hooked members 7 are pivoted at 8 to longitudinal bars 9. These bars 9 have plates 10 secured thereto by rivets or like fastening devices 12 and to these plates the ends of bars 13 are pivoted at 14. Hooks 15 are secured to the ends of the bars 9 by fastening devices 16 and these hooks hook over the adjacent bars 13 to limit the movement of these bars 9 and 13 with respect to each other, in one direction. The bars 9 and 13 are provided with eyelets 17 upon their inner faces which eyelets receive the down turned ends 18 of tie-rods 19. Those ends of the bars 13, remote from hooks 15 are pivoted at 20 to the lower ends of hook-member 21, the upper ends of which are curved at 22 to adapt them to engage over the rear edge of the front seat 6. Stops 23, carried by bars 9 project into the path of movement of the hook-members 7 and limit the movement of these hook-members in one direction. Stops 24 carried by the bars 13 limit the movement of the hook-members 21.

From the foregoing description it will be seen that the structure herein shown and described may readily be folded into small compass so that it may readily be carried in an automobile. The stops provide means for stopping the several parts in properly adjusted position. In other words, in unfolding the structure the parts will automatically be brought to rest when they reach the position illustrated in Fig. 1. It will further be noted that the pivot 12 and hook 15 render the bars 9 and 13 rigid with respect to each other against downward strain such as they are subjected to when in use and this despite the fact that the parts are capable of folding with respect to each other, as above set forth.

The structure herein shown and described is a simple and inexpensive one and renders it possible for tourists and campers to make themselves comfortable over night even though they may be out of reach of their hotel.

While the elements shown and described are well adapted to serve the purposes for which they are intended it is to be understood that the invention is not limited to the precise construction set forth but that it includes within its purview such changes as fairly come within the spirit of the appended claims.

Having described my invention, what I claim is:

1. In a device of the character described, a pair of members each comprising hooked elements adapted to be hooked over the backs of the front and rear seats of an automobile, respectively, and downwardly extending portions carried thereby, a bar pivoted to the lower end of each of said hooked members said bars being of such length as to slightly overlap each other, means for pivoting the end of one bar to the adjacent part of the other bar and means located at the end of the last named bar for engaging the other bar to limit the downward swinging of said bars to a point where they lie in substantial alinement with each other.

2. In a device of the character described, a pair of members each comprising hooked elements adapted to be hooked over the front and rear seats of an automobile respectively, a bar pivoted to the lower end of each of said hooked members, means for pivoting said bars to each other and a hook carried by one of said bars and adapted to engage the other of said bars to prevent said bars from moving out of longitudinal alinement with each other when a weight is placed upon said bar.

3. A structure as recited in claim 1 comprising tie-rods extending between said bars.

In testimony whereof I affix my signature in the presence of two witnesses.

ELVIRA R. FISCHER.

Witnesses:
  C. M. LIDDY,
  LOTTIE SOUDER.